（12) United States Patent
Trojer et al.

(10) Patent No.: US 9,283,612 B2
(45) Date of Patent: Mar. 15, 2016

(54) METHOD AND TOOL FOR CLINCHING THICK PLATES AND USE OF THE TOOL OR OF THE CLINCHING APPARATUS OR OF THE CLINCHING APPLIANCE

(75) Inventors: Andreas Trojer, Vienna (AT); Michael Matheisl, Vösendorf (AT); Thomas Illedits, Neufeld (AT); Thomas Novacek, Schwechat (AT); Markus Israel, Dresden (DE); Reinhard Mauermann, Dresden (DE)

(73) Assignee: Inventio AG, Hergiswil (CH)

(*) Notice: Subject to any disclaimer, the term of this patent is extended or adjusted under 35 U.S.C. 154(b) by 1134 days.

(21) Appl. No.: 12/539,903

(22) Filed: Aug. 12, 2009

(65) Prior Publication Data

US 2010/0018278 A1 Jan. 28, 2010

Related U.S. Application Data

(63) Continuation of application No. PCT/CH2008/000046, filed on Feb. 8, 2008.

(30) Foreign Application Priority Data

Feb. 13, 2007 (EP) .................................... 07102274

(51) Int. Cl.
*B23P 19/02* (2006.01)
*B23P 11/00* (2006.01)
(Continued)

(52) U.S. Cl.
CPC .............. *B21D 39/031* (2013.01); *B23P 11/00* (2013.01); *B23P 19/02* (2013.01); *B25B 27/02* (2013.01); *Y10T 29/49908* (2015.01)

(58) Field of Classification Search
CPC .................. Y10T 29/53704; Y10T 29/53709; Y10T 29/53991; Y10T 29/53996; B21D 39/031; B23P 11/00; B23P 19/02; B25B 27/02
USPC ............. 29/521, 520, 524.1, 525, 243, 243.5, 29/283, 283.5, 505
See application file for complete search history.

(56) References Cited

U.S. PATENT DOCUMENTS 3,555,831 A * 1/1971 Pogonowski ........... E02B 17/00
29/243.518
4,658,502 A * 4/1987 Eckold et al. ................... 29/798
(Continued)

FOREIGN PATENT DOCUMENTS

DE 102005000023 A1 * 9/2006
EP 1705385 A1 * 9/2006
(Continued)

OTHER PUBLICATIONS

English abstract of JP 10-71436 dated Mar. 17, 1998.

*Primary Examiner* — David Bryant
*Assistant Examiner* — Bayan Salone
(74) *Attorney, Agent, or Firm* — Ladas & Parry LLP

(57) ABSTRACT

A clinching tool (20) for producing a load-bearing, supporting or stable connection of a first metal workpiece (11) with a second metal workpiece (12). The clinching tool (20) comprises a die tool (20) and a counter-tool (30) which together form and join, by local plastic reshaping or deformation of the metal workpieces (11, 12), a clinch connection (13) which connects or permanently joins the first metal workpiece (11) and the second metal workpiece (12). The die tool (20) comprises a die having a flank (25) arranged concentrically with respect to the rotational axis (24). The flank (25) has a front end surface (23) perpendicular to the rotational axis (24). The flank (25) is conically shaped at least in the lower transition region (21) to the front end surface (23) and has a flank angle (W, W1, W2) smaller than or equal to 10 degrees, preferably smaller than or equal to 5 degrees.

8 Claims, 3 Drawing Sheets

(51) Int. Cl.
    *B25B 27/02*    (2006.01)
    *B21D 39/03*    (2006.01)

(56)         References Cited

U.S. PATENT DOCUMENTS

| | | | |
|---|---|---|---|
| 4,803,767 A * | 2/1989 | Obrecht | B21D 39/031 |
| | | | 29/243.5 |
| 4,831,704 A * | 5/1989 | Rapp | 29/243.529 |
| 4,831,711 A * | 5/1989 | Rapp | 29/509 |
| 4,928,370 A * | 5/1990 | Eckold et al. | 29/243.5 |
| 4,972,565 A * | 11/1990 | Eckold et al. | 29/243.529 |
| 5,230,136 A * | 7/1993 | Cronn et al. | 29/521 |
| 5,267,383 A * | 12/1993 | Sawdon | 29/243.5 |
| 5,305,517 A | 4/1994 | Schleicher | 29/798 |
| 5,432,989 A * | 7/1995 | Turek | 29/243.5 |
| 5,435,049 A * | 7/1995 | Sawdon | 29/243.5 |
| 5,528,815 A * | 6/1996 | Webb | B21D 39/031 |
| | | | 29/243.5 |
| 5,782,130 A * | 7/1998 | Sawdon | 72/481.8 |
| 5,984,563 A * | 11/1999 | Wu | 403/282 |
| 6,205,640 B1 * | 3/2001 | Dubugnon | B21D 39/031 |
| | | | 29/243.5 |
| 6,217,115 B1 * | 4/2001 | Downey et al. | 297/330 |
| 6,651,300 B1 * | 11/2003 | Muller | 29/243.5 |
| 6,676,000 B2 * | 1/2004 | Lang et al. | 227/51 |
| 6,722,013 B1 * | 4/2004 | Rapp | B21D 39/031 |
| | | | 29/283.5 |
| 6,814,531 B2 * | 11/2004 | Stevenson et al. | 411/501 |
| 6,918,170 B2 * | 7/2005 | Luthi | 29/509 |
| 7,131,310 B2 * | 11/2006 | Easterbrook et al. | 72/334 |
| 7,810,620 B2 * | 10/2010 | Nishimura | 188/322.19 |
| 7,996,977 B2 * | 8/2011 | Herb | 29/432.2 |
| 8,141,227 B2 * | 3/2012 | Nishimura et al. | 29/524.1 |
| 8,142,098 B2 * | 3/2012 | Hashimoto et al. | 403/280 |
| 8,151,464 B2 * | 4/2012 | Orend | 29/898 |
| 2002/0144386 A1 * | 10/2002 | Lang et al. | 29/243.53 |
| 2002/0148089 A1 * | 10/2002 | Frenken | 29/243.53 |
| 2004/0168297 A1 * | 9/2004 | Nishimura et al. | 29/521 |
| 2005/0016245 A1 * | 1/2005 | Easterbrook et al. | 72/326 |
| 2005/0229378 A1 * | 10/2005 | Dietrich et al. | 29/514 |
| 2006/0096075 A1 * | 5/2006 | Robinson et al. | 29/521 |
| 2009/0007409 A1 * | 1/2009 | Nishimura et al. | 29/436 |

FOREIGN PATENT DOCUMENTS

| | | | | |
|---|---|---|---|---|
| JP | 10-71436 | | 3/1998 | |
| JP | 10071436 A | * | 3/1998 | B21D 39/03 |
| WO | 2006/047848 | | 5/2006 | |

* cited by examiner

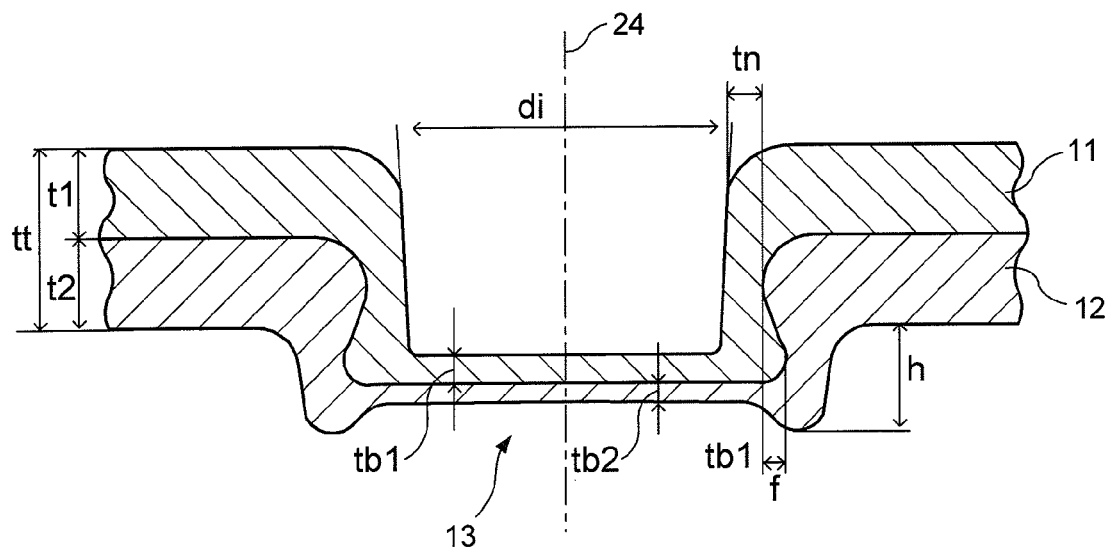
F I G. 3A
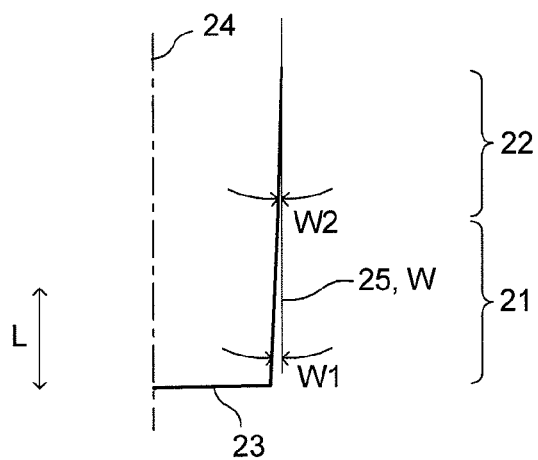
F I G. 3B

METHOD AND TOOL FOR CLINCHING THICK PLATES AND USE OF THE TOOL OR OF THE CLINCHING APPARATUS OR OF THE CLINCHING APPLIANCE

This is a continuation of copending International Application CH2008/000046 filed on Feb. 8, 2008, which designated the U.S., claims the benefit thereof and incorporates the same by reference.

The invention relates to a clinching tool for producing a load-bearing connection of two metal workpieces according to the introductory part of claim 1, to a method for clinching metal workpieces for producing a load-bearing connection according to the introductory part of claim 10, and to the use of the clinching tool according to the introductory part of claim 15.

Clinching is a deformation joining method already known for a long time. This method is also termed penetration joining. Clinching is a deformation-based connecting technology which depending on the respective form of embodiment manages without any auxiliary joining component.

For clinching there are different variants with respect to production of the joining element. Characterisation of clinching is possible in accordance with the following:
  according to the joining element construction: clinching with and without a cuffing component;
  according to the matrix shape: solid and open matrices
  according to the tool kinematics: single-step and multi-step clinching.

In the following the primary concern is clinching without a cutting component. This method has certain advantages relative to the conventional method used for connecting plates or other workpieces, such as, for example, welding, spot-welding, connecting by means of rivets or blind rivets and use of punch rivets. By comparison with conventional connecting methods, clinching without a cutting component is more advantageous when the costs per connection are taken into consideration.

The clinching of plates and other metal workpieces, which are thicker than 4 millimeters, is known from WO 2006/047848 A1. As was ascertained within the scope of the present invention, the clamping forces in this known method are, however, very high, which can lead to damage of the plates or metal workpieces when the die is withdrawn.

The object of the invention is to provide a method for clinching plates and girders of thick plates, preferably with thicknesses greater than 4 millimeters, with low clamping forces, wherein working shall be with optimum undercut stamping and largest possible neck thickness so as to ensure a correspondingly high strength of the clinch connection. In addition, an appropriate tool shall be proposed and use thereof optimised.

Fulfillment of the object takes place by the features of claim 1 for the tool, by the features of claim 9 for the method and by the features of claim 14 for the use.

Advantageous examples of embodiment and developments of the invention are circumscribed or defined by the respective dependent patent claims.

According to the invention it is possible for the first time to clinch steel plates and steel girders or steel profile members (here generally termed metal workpieces) with low clamping forces, wherein at least one of these elements has a thickness above 4 millimeters.

In order to make this possible the clinching tools were appropriately developed and optimised. The tools or apparatus according to the invention are distinguished by the fact that they have a conically shaped die, with two transition regions, wherein the transition region has in the area of the front end surfaces a greater angle than the upper transition region connected therewith. The greater flank angle can be smaller than or equal to 10 degrees and go over to a flank angle of 5 degrees to zero degrees. The diameter of this die preferably lies in the range between 10 millimeters and 35 millimeters. Particularly preferred are diameters between 12 millimeters (14 millimeters, 16 millimeters, 18 millimeters) to 20 millimeters or 25 millimeters, wherein this diameter depends on the thickness of the metal workpieces to be connected and on the required strength or tensile force.

Through the present invention, clinching is a real alternative to welding, which hitherto was mostly used as the joining method for connecting thicker plates or workpieces (for example St-37, St-44, St-52, St-70 plate or EN-S235, S275, S355, S460 plate) or girders (thickness>4 millimeters). However, the clinching can also replace rivet and screw connections.

According to the invention, plates, profile members and other metal components or metal workpieces of different thickness and different materials can be connected together. The connection of two metal workpieces comes about exclusively in the clinching and directly from the material or materials of the metal workpieces to be connected. The elements connected by clinching are here termed clinched workpiece.

The present invention now makes it possible to also use metal workpiece connections, for example steel connections, plate profile member connections, plate part connections, plate strip connections or quite generally plate connections, to increasing extent in lift and escalator construction, wherein, inter alia, a part of the lift cage or the lift and/or of the lift engine room or of the framework or supporting structure of an escalator can be produced by means of clinching technique.

However, various load-bearing attachment parts can be fastened by means of clinching technology as well as load-bearing or supporting frameworks, structures, brackets, sculptures, chassis, panels or frames.

A non-detachable connection of two metal workpieces, which in addition achieves substantial holding forces (tensile forces and shear forces), is created by the present invention. Under dynamic loading it emerges that the thus-produced clinched workpieces have a significantly better load-bearing behaviour than spot-welded connections.

Both coated and uncoated materials can be connected together without problems in accordance with the invention, which opens up new possibilities of material selection particularly in lift and escalator construction. Thus, for example, plated, painted or plastic-coated plates and/or steel girders can be connected together without the coating suffering noticeable damage due to the clinching.

A further advantage of the clinching is that for producing the connection neither preliminary aperturing operations nor auxiliary joining parts, connecting parts or connecting material are needed. The principal advantage of clinching relative to conventional methods is, however, the low joining costs. Moreover, no heat intake or heat induction into the workpieces to be connected takes place, so that distortion, fusion and structural changes are avoided.

Further details and advantages of the invention are described in the following on the basis of an example of embodiment and with reference to the drawing, in which:

FIG. 3A shows a section through two clinched metal workpieces;

FIG. 3B shows a part section or detail of a region of the clinching tool according to the invention;

The scope of the present patent application, as already indicated in the introduction, concerns clinching without a cutting component. This form of clinching is a pure deformation joining process. Connecting of the workpieces is realised merely by penetration in conjunction with recessing and subsequent upsetting. The underlying principle in the development of this method without a cutting component is primarily the desire for increased connection stiffness as a consequence of greater material confinement.

Figure 1:
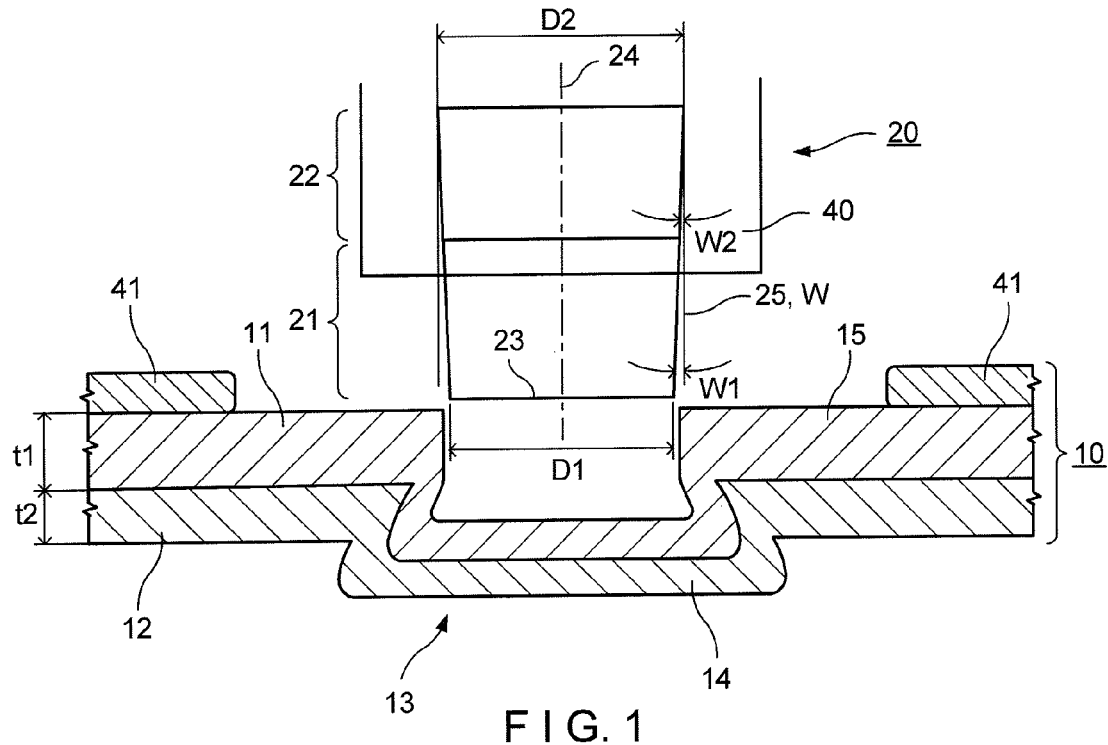
FIG. 1 shows the die of a clinching tool and two metal workpieces connected together by clinching, in a substantially simplified schematic illustration.

The principle of the invention is illustrated in FIG. 1 purely schematically. Two metal workpieces 11 and 12 which were connected together by a clinch connection 13 are shown. A part of the die tool 20, which is here termed die, is shown above the clinch connection 10 or the clinching point 10.

Figure 2A:
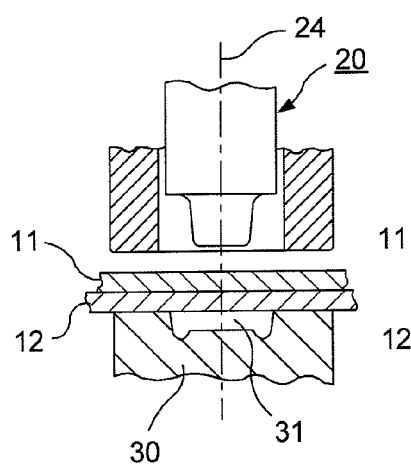
FIG. 2A shows a first step of clinching according to the invention, in a schematic illustration, wherein the two transition regions of the die are not illustrated.
Figure 2B:
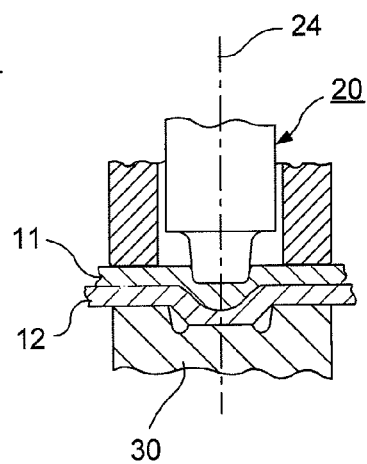
FIG. 2B shows a second step of clinching according to the invention, in a schematic illustration, wherein the two transition regions of the die are not illustrated.
Figure 2C:
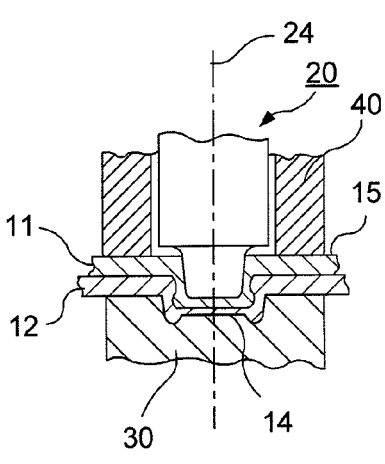
FIG. 2C shows a third step of clinching according to the invention, in a schematic illustration, wherein the two transition regions of the die are not illustrated.

The clinching tool 20 comprises a die and a counter-tool 30 which can be constructed as a matrix or anvil. The die is designed to be rotationally symmetrical with respect to its rotational axis 24. The die has a flank 25, which is arranged concentrically with respect to the rotational axis 24, with a flank angle W. With respect to a terminal front end surface 23 of the die distinction is to be made, in the case of the flank 25, between a lower transition region 21, which adjoins the front end surface 23, of the flank 25 with a flank angle W1 and an upper transition region 22, with a flank angle W2, of the flank 25. The two transition regions 21, 22 merge into one another. In that case they can, as shown in the examples of embodiment according to FIGS. 1, 3B and 6A, merge into one another in non-continuous mode and manner and have different flank angles W1, W2. The metal workpieces 11, 12 to be connected (for example, two plates of different or the same thickness t1 and t2) are pressed by the die, similarly to stamping or upsetting, under plastic deformation into a depression, recess, cavity or deformation space 31 of the matrix 30, as shown in FIGS. 2A to 2C. A clinch connection 13, which has a shape similar to a pushbutton, a compression point or a stamping point, arises by virtue of a special form of the depression, recess, cavity or deformation space 31. The clinch connection 13 connects the metal workpieces 11, 12 together in shape-locking and force-locking manner, as schematically indicated in FIG. 1, FIG. 2C, FIG. 3A and FIG. 4.

FIGS. 2A to 2C show, in three stages, the formation of the clinch connection 13 without cutting component by a counter-tool 30 constructed as a rigid matrix, this matrix having a recess, cavity, deformation space or depression (31) in the region of the processing surface, wherein the die deforms the metal workpieces 11, 12, which are arranged on the processing surface, in an intersection region or overlap region above the recess, cavity, deformation space or depression 31 in such a manner that a local undercut f forms in the recess, cavity, deformation space or depression 31 by radial flow of the materials. In a first step according to FIG. 2A it can be seen that the first metal workpiece 11 and the second metal workpiece 12 lie against one another (i.e. in a position one on the other). The two metal workpieces 11, 12 placed one on the other are then provided in common on a processing surface of the counter-tool 30, in the form of a matrix. In FIG. 2B it is shown how the die of the die tool 20 is advanced and was already partly sunk into the workpieces 11 and 12. The workpieces 11 and 12 deform in an intersection region or overlap region under the high pressure of the die and the material 'flows' into the recess, cavity, deformation space or depression 31 of the matrix 30. The sinking-in or pressing-in of the die is carried out until the underside 14 of the second metal workpiece 12 substantially bears against the base of the recess, cavity, deformation space or depression 31 of the matrix 30. In a further step the die is then withdrawn (this step substantially corresponds with the situation shown in FIG. 1).

According to the invention use is preferably made, during separation, of a stripper or holding-down device 40 which facilitates separation of the die after deformation of the metal workpieces 11 and 12. Such a stripper or holding-down device 40 is particularly advantageous when the die, due to the forces and material deformations arising during deforming, might jam in the clinch connection 13. The stripper 40 is (quasi) supported relative to the surface 15 of the upper metal workpiece 11 at the die side whilst the die is retracted or drawn back. With knowledge of the present invention the expert can obviously also realise a stripper at the matrix side instead of a stripper at the die side.

The metal workpieces 11 and 12 to be connected are preferably urged towards or against the matrix 30 by a holding-down device which is characterised in FIG. 1 by the number 41 or 40. The die tool 20 comprises a pressure cylinder (for example a hydraulic cylinder, compressed gas cylinder, hydropneumatic cylinder, servo-electric cylinder) which produces the so-called die forward stroke in the direction of the metal workpiece 11 and subsequently the workpiece 12. In a first phase of the die forward stroke the die is advanced (FIG. 2A), then the recessing phase takes place in which the die is sunk into the metal workpieces 11, 12 and these are upset and deformed (FIGS. 2B and 2C). A phase termed die return stroke finally takes place (see FIG. 1).

As a consequence of the upsetting pressure during the recessing a transverse flow of the material of the metal workpieces 11 and 12 occurs, whereby the matrix 30 with the recess, cavity, deformation space or depression 31, for example in the form of a (machined) annular groove, is substantially or entirely filled up and an undercut of the metal workpiece 11 at the die side is produced in the metal workpiece 12 at the matrix side (see FIG. 3A). Undercut f and neck thickness tn are the most important or most significant for assessing a clinch connection 13, as shown in FIG. 3A, since the load-bearing capability of the clinch connection 13 is in direct correlation with these variables. A clinch connection 13 and the workpieces 11 and 12 can additionally be characterised by the following particulars: inner diameter di of the joining element or die, protrusion height h, residual base thickness tb2 of the metal workpiece 12 at the matrix side, residual base thickness tb1 of the metal workpiece 11 at the die side, metal workpiece thickness t2 at the matrix side, metal workpiece thickness t1 at the die side and total workpiece thickness tt. A typical value for the undercut f is 0.5 millimeters and a typical value for the neck thickness tn is 1.5 millimeters.

Different tests and experiments were undertaken in order to optimise the clinching process, which is known per se, and so modify it that it is also possible to clinch metal workpieces 11, 12 thicker than 4 millimeters without excessively high clamping forces arising. Simulations were undertaken and subsequently different tools produced and joining tests conducted in order to be able to compare the determined (in the experiment) cross-sections, joining forces and holding-down forces with the reference based on the simulation. Tool design principles for clinching without a cutting component and with a solid matrix 30 served as the basis for the tests with respect to tool design.

First tests yielded the result that for the production of a clinch connection 13 for a small die diameter (diameter D2=12 millimeters or 14 millimeters) joining forces of approximately 400 kN to 510 kN have to be used and for the larger die diameter (D2=20 millimeters) joining forces of approximately 670 kN have to be used (both inclusive of holding-down force). These results in themselves lie in the region of the anticipated outcome (however, notwithstanding tool lubrication a high level of jamming of the die in the workpiece occurred).

More precise tests with respect to the jamming of the die have shown that the jamming is caused by a radial stress acting on the flank of the die. It has proved that excessive radial stresses arise particularly in the upper transition region 22 of the flank 25. In a further optimisation step the geometry of the die was now selectively changed in such a manner that a lower radial stress acted on the flank 25. Due to the fact that in the first tool variants the neck thicknesses tn and undercut values f of the die with the diameters D2=12 millimeters and D2=14 millimeters were almost the same, further optimisations were undertaken. Tests were in that case also made on workpieces with different overall workpiece thicknesses tt and with workpieces 11, 12 having different thicknesses t1, t2. In that case it has proved that commercially available or conventional dies not only exhibit a strong tendency to jamming if there is progress to total workpiece thicknesses tt>8 millimeters, but that a cavity (see X in FIG. 4C) forms in the region between the workpieces 11, 12. This cavity X prejudices and reduces the strength of the corresponding clinch connection 13.

The various optimisation steps have led to the recognition that the design of the flanks of the die has a direct influence on the jamming and the formation of the cavity X. In order to reduce or entirely eliminate these two negative effects dies were developed and tested which are shaped conically at least in part. With suitable selection of the corresponding flank angle W, W1, the jamming could be reduced or entirely prevented without leading to a detectable cavity formation. It is proved that these two effects are correlated only in part and are even mutually contradictory in part. Through the selection of a suitable angle range the two effects could be minimised.

In the tests shown in FIGS. 4A to 4C and described in the following the die (not according to the invention) has in each instance a constant die flank angle W=5°, i.e. D1<D2, or, stated in other words, at least that part of the die coming into contact with the workpieces 11 and 12 during recessing narrows in downward direction (i.e. in the direction of the end of the die at the workpiece side).

Figures 4A, 4B, 4C:
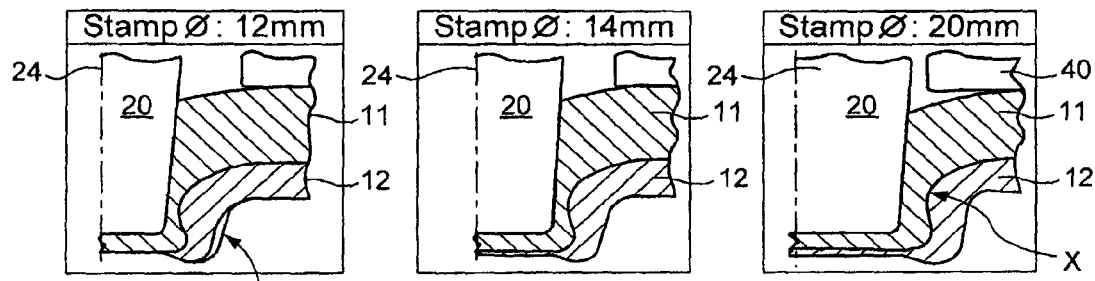
FIG. 4A shows a section showing two clinched metal workpieces or metal components and a part of the clinching tool (not according to the invention), wherein the die of the clinching tool has a diameter of 12 millimeters.
FIG. 4B shows a section showing two clinched metal workpieces and a part of the clinching tool (not according to the invention), wherein the die of the clinching tool has a diameter of 14 millimeters.
FIG. 4C shows a section showing two clinched metal workpieces and a part of the clinching tool (not according to the invention), wherein the die of the clinching tool has a diameter of 20 millimeters.

Some aspects of the different tests are illustrated in FIGS. 4A to 4C, because they are applicable in analogous manner to the die according to the invention. The flow behaviour of the workpieces 11, 12 in the case of use of dies with different diameters is shown. In FIG. 4A it is shown how the two metal workpieces 11, 12 deform when the die has a diameter of 12 millimeters. In FIG. 4B it is shown how the two metal workpieces 11, 12 deform when the die has a diameter 14 millimeters. FIG. 4C shows how the two metal workpieces 11, 12 deform when the die has a diameter of 20 millimeters. In all three illustrations there is use of a snapshot shown before the die return stroke.

It can be seen on the basis of FIGS. 4A to 4C that the diameter D2 of the die has an influence on the transverse flow of the materials or metal workpieces. In the case of the die with 12 millimeter diameter the material of the metal workpiece 12 does not flow entirely into the cavity formed by the recess, deformation space or depression 31, as can be seen in the region marked by Y. In the case of a 14 millimeter die a good 'filling' of the recess, cavity, deformation space or depression 31 results. If use is made of a die with 20 millimeter diameter, then a cavity (denoted by X in FIG. 4C) appears between the workpieces 11 and 12.

As the diverse experiments and researches have shown, the die diameter is only one of various parameters having a direct influence on the clinching process and the strength of the clinch connection 13. It has proved that for the clinching of thicker workpieces with tt>8 millimeters, the design of the flank 25 has a particularly important and significant role.

The present invention is accordingly distinguished by the fact that the die, which is sunk into the metal workpieces 11 and 12 during the deforming, is conically shaped. The conical shape of the die extends at least over a part (termed transition regions 21, 22) of that length L of the die which is sunk or pressed into the workpieces 11, 12. The conical shape results due to the fact that the flank 25 of the die—see FIG. 3B—is conically shaped at least in the lower transition region 21 to the front end surface 23 and has a flank angle W1 which is smaller than or equal to 10 degrees, preferably smaller than or equal to 5 degrees. As further shown in FIGS. 1 and 6A, the flank angle W2 of the upper transition region 22 is preferably equal to zero degrees or similarly preferably smaller than or equal to 5 degrees (examples of embodiment according to FIGS. 4A to 4C as well as 6B).

Dies have proved particularly satisfactory with a diameter D2 between 10 millimeters and 20 millimeters and with a flank angle W, W1, W2 going over from a first angle W1 to a second angle W2, wherein the first angle W1 is smaller than or equal to 10 degrees and preferably smaller than or equal to 5 degrees and the second angle W2 is smaller than or equal to 2 degrees, and preferably 0 to 1 degrees. In that case the first angle W1 is located in the immediate (lower) transition region 21 to the front end surface 23 (i.e. in the region of the end of the die at the workpiece side) and the second angle W2 on the (upper) transition region 22 going away, extending out or projecting from the metal workpiece 11, 12 (i.e. in the region of the die at the tool side).

This construction of conical dies exhibits a significantly lesser tendency to jamming and no (or only poorly pronounced) cavities X form. The advantage of the lower radial stress and thus the lesser tendency to jamming are, however, 'paid for' by the creation of the cavity X between the metal workpieces 11, 12, i.e. the flank angle W, W1, W2 cannot be selected arbitrarily, since otherwise the cavity X would be too large and the strength of the clinch connection too small.

Forms of construction of the die are ideal in which the flank recessing or flank reduction produced by the flank angle is not too large, since in the case of a too-large flank recessing or flank reduction the radially directed pressure on the workpieces 11, 12 is too small and the transverse flow of the materials or of the metal workpieces thus reduces.

The indicated angle values for W, W1, W2 have also proved satisfactory because the clinch connections produced by these dies have values for the neck thickness tn and the undercut f similar to and comparable with the commercially available, conventional purely cylindrical thin-sheet die. This means a comparable, identical tensile strength of the corresponding clinch connection 13.

The conical shape of the die extends at least over the transition regions 21, 22 with that length L of the die which is sunk into the workpieces 11, 12. This length L in the case of metal workpieces having an overall workpiece thickness tt>8 millimeters can be determined as follows: 0.3 tt≤L≤2 tt, i.e. the conically shaped transition regions 21, 22 correspond with between three tenths of the total workpiece thickness tt and twice the workpiece thickness tt.

Figure 6A:
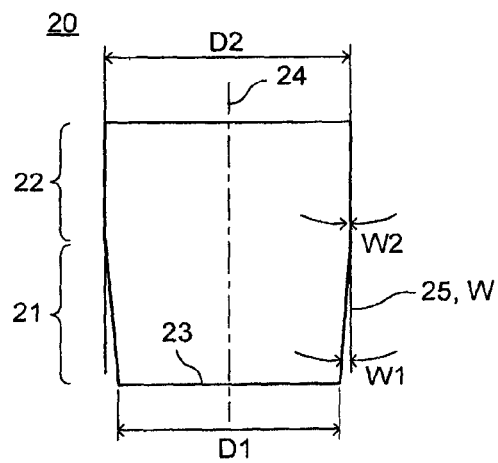
FIG. 6A shows a section through a schematically illustrated die according to the invention.

The different die shapes according to the invention are summarily explained in the following by way of FIGS. 1 and 6A.

| Form of embodiment | 1 | 2 |
| --- | --- | --- |
| FIG. | 1 | 6A |
| Typical diameter | D1 < D2 and 10 mm ≤ D2 ≤ 30 mm | D1 < D2 and 10mm ≤ D2 ≤ 30 mm |
| Length L of the transition regions 21, 22 | 0.3 tt ≤ L ≤ 2 tt | 0.3 tt ≤ L ≤ 2 tt |
| Angle | W1 ≤ 10 degrees in the lower transition region 21 and W2 = 0 in the upper transition region 22 | W1 ≤ 10 degrees in the lower transition region 21 and 0 degrees ≤ W2 in the upper transition region 22, wherein W > W2 |

The attained strengths, which are achieved with the die according to the invention, for example with a die with 12 millimeter diameter and a 5° to 0° die flank (form of embodiment 2, FIG. 6A), is on the average more than 50 kN or 55 kN. In the case of particularly carefully selected conditions the tensile force even lies at approximately 58 kN with a slight tolerance of only a few percent.

With the die tool 20 according to the invention it is also possible to produce two clinch connections 13 adjacent to one another (see FIG. 5) in order to further increase the tensile strength and shear strength. In this case it has proved that the tensile strength could be increased to values which are almost twice as large by comparison with a single clinch connection 13. The samples could be loaded in average with approximately 118 kN.

Figure 5:
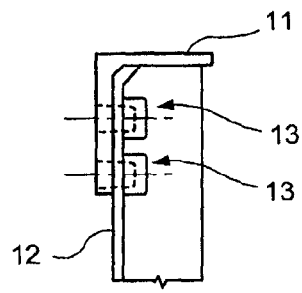
FIG. 5 shows a section through a steel profile member to which a plate profile member, steel profile member or steel angle member was fixedly clinched by two clinch connections.

A particularly advantageous clinching tool 20 comprises two identical dies which are arranged adjacent to one another and which are capable of connecting the first metal workpiece 11 with the second metal workpiece 12 by two clinch connections. Two clinch connections adjacent to one another are produced simultaneously here by an advance movement and a recessing movement. The example of a corresponding double clinch connection is shown in FIG. 5. It can be seen in the illustrated example that in accordance with the invention, for example, a thicker steel profile member girder 11 (first metal workpiece) can be connected with a thinner plate, steel sheet, sheet iron, steel profile member, plate profile member or plate profile angle member 12 (second metal workpiece) by two clinch connections 13 disposed adjacent to one another.

Two criteria are to be taken into consideration for the stripping (stripper) force design of the stripper 40. On the one hand the stripping force or stripper force has to be larger than the jamming force of the die. This value is naturally strongly dependent on the die geometry employed, as was described, but also on the lubrication or coating of the tools. Maximum ejection forces of 30 kN to 40 kN have led to very reliable results. In an optimum design of the flank angle W or the conicity of the die, ejection forces attain 25 kN. A further reduction in ejection force can even be taken into account for the 5° to 0° die (form of embodiment 2, FIG. 6A), since jamming of the die never occurs here.

In a particularly advantageous form of embodiment the stripper 40 also functions at the same time as a holding-down device (41) and is dimensioned so that the metal workpieces 11, 12 experience a smallest possible deformation in order to keep the distortion of the workpieces 11, 12 as small as possible or keep them free of distortion.

Particularly stable and load-bearing components, subassemblies or constructional elements can be produced in a mode and manner which are as simple, trouble-free, economic and reliable as possible by the dies according to the invention and the clinching tools or clinching machines which have or possess the corresponding dies. The costs for these components, subassemblies or constructional elements with clinch connections 13 lie below those of welded, riveted or screwed connections. The composite material costs for components, subassemblies and constructional elements with clinch connections 13 are zero. Moreover, the working time is restricted, reduced or confined to a minimum.

According to the invention clinch connections 13 can also be produced, without a cutting component, by open matrices. In that case resiliently mounted plates of the matrices are urged outwardly after the recessing process by the radial flow of the workpiece material below the die and thus enable formation of the undercut.

Apart from the advantages of conventional clinching, matrix-free clinching can also be used in which use is made of an anvil with flat processing surface as counter-tool 30, wherein the die deforms the metal components, metal parts or metal workpieces, which are arranged on the processing surface, in an intersection region or overlap region in such a manner that initially an elevation forms at the anvil side and then, through radial flow of the materials, a local undercut f. The matrix-free clinching has the following advantages by virtue of its special principle of function:

An offset between joining) die and counter-tool (anvil) does not impair the quality of the connection 13. The demands on accuracy for the joining machine thereby are not diminished.

Time-consuming setting up operations can be eliminated.

Wear reduces and processing reliability increases, since break-outs at the matrix edge can no longer occur.

The same anvil can be used for all joining tasks. A change of matrix in the case of change of joining task, as in the case of conventional clinching, is no longer necessary.

The joint connections 13 are flatter and less disruptive than the connections produced by conventional clinching.

A change in the sheet thickness is possible without tool change and saves valuable working time.

A change in the material pairing takes place without outlay.

Matrix-free clinching increases the number of clinch connections or joining points per tool set or per (joining) die.

The invention claimed is:

1. Clinching tool (20) for producing a load-bearing connection of a first metal workpiece (11) with a second metal workpiece (12), at least one of the workpieces having a thickness greater than 4 mm, wherein the connection does not include a perforation of either of the workpieces, wherein the clinching tool (20) comprises a die tool and a counter-tool (30) which together form, by deformation of the two metal workpieces (11, 12) without perforation, a clinch connection (13) connecting together the first metal workpiece (11) and the second metal workpiece (12), and wherein the die tool comprises a die (21, 22), which is constructed to be rotationally symmetrical with respect to a rotational axis (24) of the die and has a flank (25) arranged concentrically with respect to the rotational axis and a front end surface (23) lying perpendicularly to the rotational axis (24), wherein the flank (25) of the die is conically shaped at least in a lower region (21) to the front end surface (23) and has a varying flank angle (W, W1, W2) which is smaller than or equal to 10 degrees, characterized in that the flank angle (W, W1, W2) has a first angle portion (W1) extending along a length of the flank leading to the front end surface of the lower region (21), and a second angle portion (W2) extending along a length of the flank of an upper region (22), wherein the first angle (W1) is larger than the second angle (W2), wherein the upper region is adapted to at least partially sink into the metal workpieces during workpiece deformation without the die perforating either workpiece, and abutting ends of the first and second angle portions merge into each other without a step therebetween.

2. Clinching tool (20) according to claim 1, characterised in that the entire length (L) of the die adapted to be sunk into the metal workpieces (11, 12) during the deforming is conically shaped.

3. Clinching tool (20) according to claim 1, characterised in that the first angle (W1) is smaller than or equal to 10 degrees and the second angle (W2) is smaller than or equal to 2 degrees.

4. Clinching tool (20) according to claim 1 characterised in that the die has a diameter (D2) between 10 and 35 millimeters, wherein the diameter (D2) lies between 12 and 25 millimeters (inclusive).

5. Clinching tool (20) according to claim 1, characterised in that the counter-tool (30) is constructed as an anvil having a flat, even, planar, horizontal or level working area.

6. Clinching tool (20) according to claim 1, characterised in that the counter-tool (30) is constructed as a matrix having a recess, cavity, deformation space or depression (31).

7. Clinching tool (20) according to claim 1, characterised in that it comprises a holding-down device (41, 40) for fixing the metal workpieces (11, 12) and a stripper (40) for separating the die after deformation of the metal workpieces (11, 12).

8. Clinching tool (20) according to claim 1, characterised in that it comprises two identical dies which are arranged adjacent to one another for connecting the first metal workpiece (11) with the second metal workpiece (12) by two clinch connections (13).

* * * * *